United States Patent [19]
Wavre

[11] Patent Number: 5,962,937
[45] Date of Patent: Oct. 5, 1999

[54] X-Y TABLE FOR MOVING LOADS IN A HIGHLY EXACT AND DYNAMIC MANNER

[76] Inventor: Nicolas Wavre, Crêt-Taconnet 40, CH-2000 Neuchâtel, Switzerland

[21] Appl. No.: 09/055,983

[22] Filed: Apr. 7, 1998

[30] Foreign Application Priority Data

Apr. 11, 1997 [CH] Switzerland ............... 0845/97

[51] Int. Cl.$^6$ ............... H02K 41/02; H02K 41/35
[52] U.S. Cl. ............................................. 310/12
[58] Field of Search .................. 310/12, 13, 14; 318/135

[56] References Cited

U.S. PATENT DOCUMENTS

| | | | |
|---|---|---|---|
| 4,563,602 | 1/1986 | Nagasaka ................................. | 310/12 |
| 5,114,302 | 5/1992 | Meisser et al. ......................... | 414/751 |

FOREIGN PATENT DOCUMENTS

| | | |
|---|---|---|
| 30 37 648 | 4/1981 | Germany . |
| 30 37 148 | 4/1982 | Germany . |
| 678 907 | 11/1991 | Switzerland . |

OTHER PUBLICATIONS

Patent Abstracts of Japan vol. 018, No. 366 (M–1636), Jul.1994 & JP 06 099327 (Yaskawa Electric Corp), Apr. 12, 1994.

*Primary Examiner*—Nestor Ramirez
*Assistant Examiner*—Judson H. Jones
*Attorney, Agent, or Firm*—Griffin, Butler, Whisenhunt & Szipl, LLP

[57] ABSTRACT

This X-Y table can move a load (CH) along perpendicular active directions (X, Y). It includes a base (1), a carriage (4) for the load (CH) mounted so as to move on the base along the active directions (X; Y), in particular via sliding means (3, 4) for each of said directions, two linear motors (B, C) which each include a stator (5) and a moving element (6) coupled to the carriage (4). Coils and magnets are respectively embedded in the moving elements and in the stators for applying driving forces to the carriage (4) along the active direction of the motor concerned (B, C), while allowing the moving element mobility in the other active direction with respect to said stator element.

According to the invention, the length of the permanent magnets of the stator (5) of each of the two motors is greater than the length of the coils of the corresponding moving element along the direction perpendicular to the active direction of the motor concerned in the X-Y displacement plane, the difference between these two lengths being substantially equal to or greater than the travel of the moving part of the X-Y table along said perpendicular direction.

13 Claims, 4 Drawing Sheets

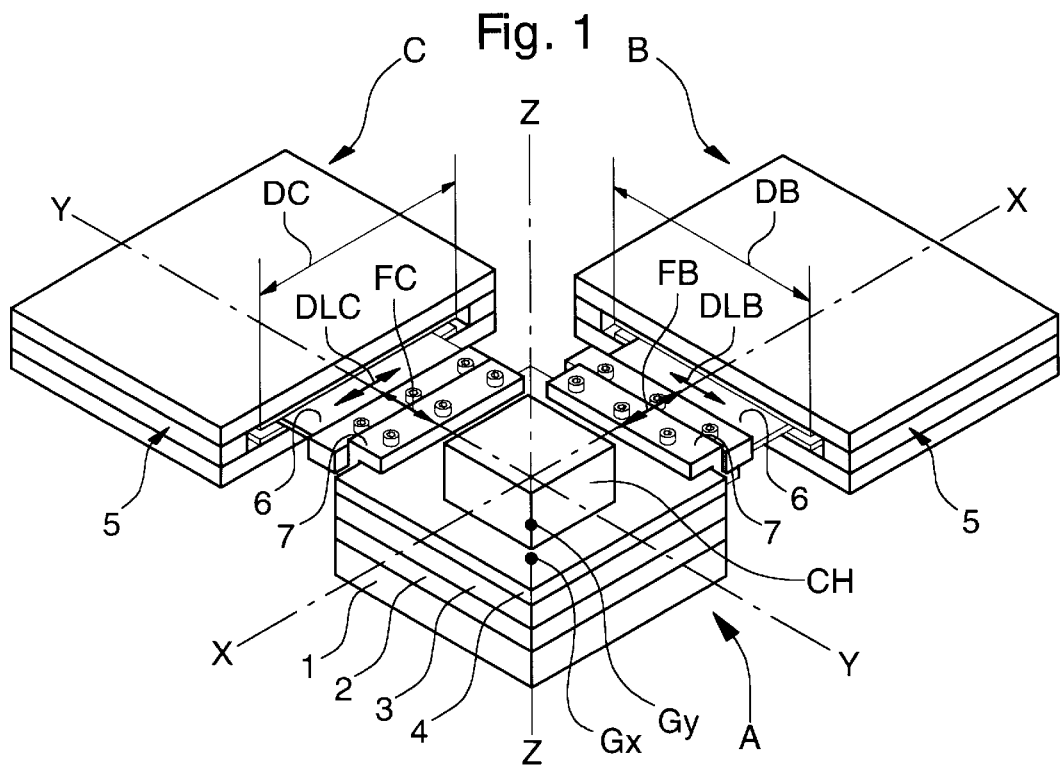
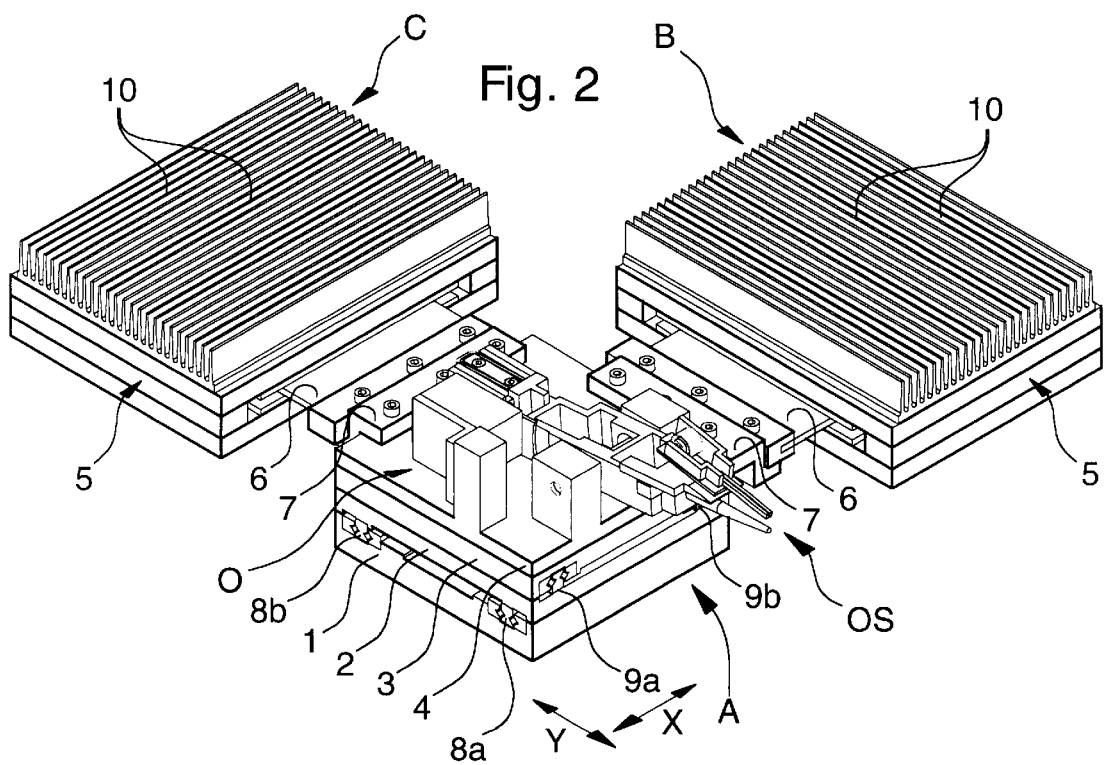

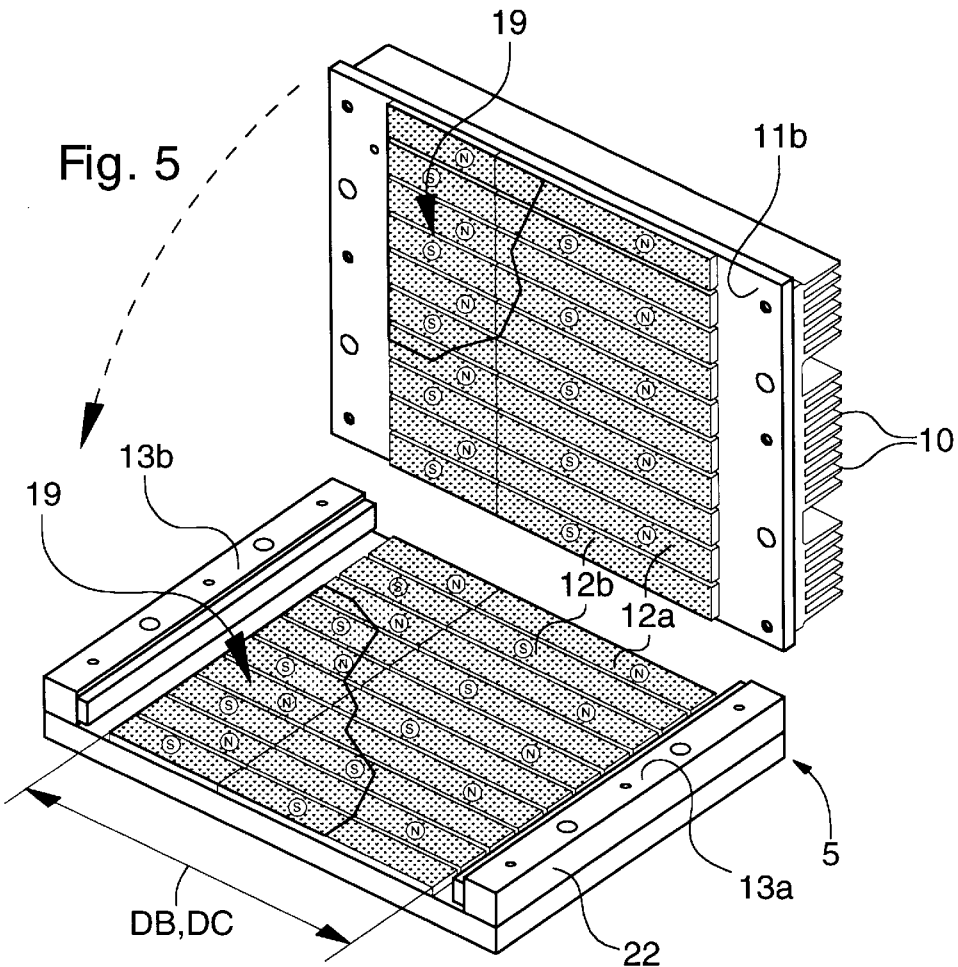
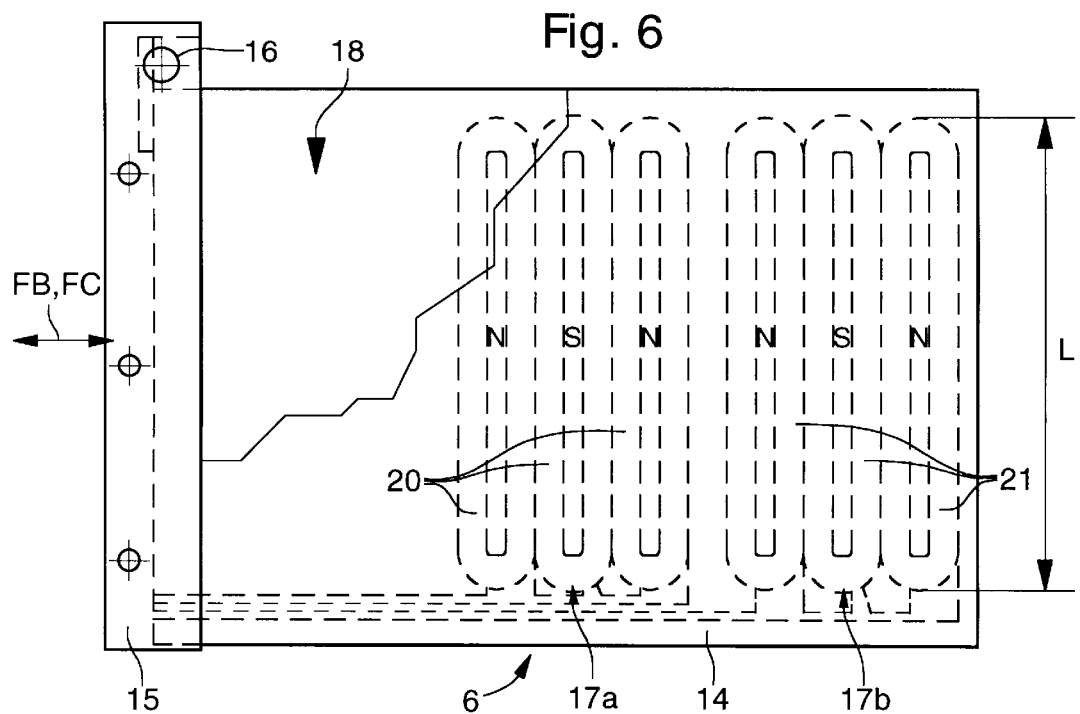

X-Y TABLE FOR MOVING LOADS IN A HIGHLY EXACT AND DYNAMIC MANNER

The present invention relates to X-Y tables intended to assure the movements of various loads along two perpendicular axes.

More particularly, the invention concerns such X-Y tables used for moving loads in a highly dynamic and exact manner, requirements which are often imposed on machines designed for performing manufacturing operations on parts of small or tiny dimensions, such as integrated circuits for example. In this field in particular, X-Y tables are required to have a positioning accuracy of one micrometer or less, a speed of movement along each axis of several m/s and a high level of both static and dynamic rigidity.

One application of an X-Y table according to the invention, to which the latter is obviously in no way limited, is that of machines for bonding connecting wires to integrated circuits.

A table of this type is disclosed in Swiss Patent No. 678 907. It includes a base onto which a sliding plate is fixed. A carriage can slide on said plate with very slight friction, said carriage supporting the load and being associated with guide means which compel the carriage to move along two perpendicular directions X-Y. Electric motors are provided for driving the carriage. They are designed in such a way that the motor assigned to movement along one of the directions allows the carriage to move along the other direction. The moving elements of the motors are directly coupled to the carriage and their fixed elements are placed on the base of the table.

In one of the alternative embodiments described in this prior art document and shown in FIG. 3 thereof, each motor includes a magnetic frame formed of two ferromagnetic parts placed one above the other with a certain gap between them. This gap constitutes an airgap in which the moving element of the motor moves, said element being directly coupled to the carriage. A coil is wound on each ferromagnetic part. The coils co-operate with magnets carried by the moving element.

If the motor is considered, in this structure, as having the X direction as its active direction for example, the ferromagnetic parts and the airgap have a smaller size in the non active Y direction, than the size of the moving element in this same direction. This arrangement thus allows movement of the moving element intended for the active X direction along the Y direction.

Moreover, the winding axis of the coils in this same motor is oriented in the X direction so that the magnetic flux traces a virtual loop whose general plane is parallel to the X direction and whose central axis extends in the Y direction.

This known structure can only be made with four stator poles, i.e. two per ferromagnetic part, which results in a limited travel for the moving element along its own active direction. As each motor is affected by this same defect, the travels of the carriage in both directions are limited to the same extent.

This structure of the table motors has another serious drawback, in that the transverse opening in each motor defined by the airgap within which the moving element is situated, is oriented perpendicular to the active direction of said motor, so that the traction force which it exerts on the carriage has a lever arm generating a moment of force on said carriage in the plane of the active directions to the detriment of good movement dynamics, since this moment of force then causes the carriage to rotate about an axis perpendicular to this plane.

An X-Y table formed of at least two linear motors is also known from German Patent No. 3037148. In particular different embodiments, each linear motor is formed, on the one hand, by a single excitation or energising coil and, on the other hand, by two permanent magnets aligned along the active direction of the motor concerned with a reverse polarity to each other. In all these particular embodiments (see FIGS. 1 to 9 and 15 to 17), the dimension of the permanent magnets, along the direction perpendicular to the active direction of a given motor in the displacement plane of the moving part of the table, is considerably less than the corresponding dimension of the coil associated with said given motor's moving element.

The embodiments proposed with a fixed coil associated with a magnetic armature of the stator and two permanent magnets associated with the moving element are very disadvantageous and have shown themselves to be of very delicate design. Indeed, the permanent magnets being attracted by said magnet have to be held in a central position defining an unstable equilibrium. As soon as the magnets are situated other than in this central position, they are strongly attracted by the magnetic armature; which creates instabilities and greatly reduces the efficiency of the linear motor.

All the alternative embodiments of an X-Y table with fixed permanent magnets disclosed in German Patent No. 3037648 have the same drawbacks as those mentioned for the X-Y table disclosed in Swiss Patent No. 678907. Indeed, considering, for example, the X-Y table disclosed in FIGS. 1 and 2 of this German Patent, it is noted that the resulting force exerted by a linear motor on the moving part varies relative to said moving part's centre of gravity as a function of the relative position of the coil associated with the motor's moving element with respect to the permanent magnets of the stator of said linear motor. Further, the monophase structure with the coil and two permanent magnets of reverse polarity limits the travel to small movements.

The fact that the resulting force exerted by a linear motor on the moving part varies relative to the centre of gravity of said moving part when the latter is moved or driven by another linear motor along the direction perpendicular to the active direction of the linear motor concerned results from the fact that only the section of the coil which is superposed with respect to the permanent magnets is active. In other words, the resulting force of a linear motor defines a substantially fixed straight line relative to the stator of the X-Y table. Thus, variable moments of force (torques) causing instability in the moving part are generated during operation of the X-Y table disclosed in the aforementioned German Patent.

An object of the invention is to provide a highly dynamic X-Y table wherein the aforecited drawbacks of the tables of the prior art are removed.

The invention thus concerns an X-Y table intended to move a load, such as a tool, along two mutually perpendicular active directions, said table including:
 a base;
 A carriage adapted to receive said load and mounted so as to move on the base along said directions; and
 at least two electric linear motors arranged for driving said carriage respectively along said two active directions, each of the two motors including a stator provided with permanent magnets and a moving part provided with at least one excitation coil and mechanically coupled to said carriage. The permanent magnets and the excitation coil are arranged so that, when said excitation coil is supplied, their magnetic coupling generates a driving force along the active direction of the given motor, said moving part being capable of being moved along each of the two active directions. This table is characterised in that the dimension of said at least one excitation coil of either of the two motors, along the active direction of the other of said two motors, is smaller than the corresponding dimension of the permanent magnets of said motor, the difference between these two dimensions being substantially equal to or greater than the travel of the moving element of the motor concerned along the active direction of the other of said two motors.

As a result of these features, the resulting force generated by each motor defines a straight line along the active direction of the motor concerned which has a fixed position relative to the moving element of said motor, whatever the position of the moving element in the perpendicular direction to the active direction of said motor in the displacement plane of the moving carriage. Consequently, the resulting forces exerted on the moving carriage remain spatially fixed in a referential connected to the moving carriage.

According to particular advantageous features of the present invention, the linear motors are arranged so that the straight lines defined by the resulting forces of the two active linear motors along the two perpendicular X-Y directions substantially intersect the vertical straight line passing through the centre of gravity of the moving mass to which the moving elements of said motors are attached.

In a preferred embodiment, the masses moved along the two perpendicular X-Y directions form a single same moving part, the two straight lines defined by the resulting forces of the aforementioned two linear motors substantially intersecting the vertical straight line passing through the centre of gravity of said single same moving part. In a preferred alternative of this preferred embodiment, the X-Y table is arranged so that the two straight lines defined by said two resulting forces are substantially aligned on the centre of gravity of said single same moving part.

The present invention will be described in more detail with reference to the following description, given solely by way of example and made in conjunction with the annexed drawings, in which:

FIG. 1 is a schematic perspective view of an X-Y table according to the invention;

FIG. 2 is a more detailed perspective view of said table showing, in particular, an example of a load able to be driven by the table, in this case a bonding tool intended to carry out bonding operations;

FIG. 5 shows a perspective view of the stator dismantled from one of the linear motors;

FIG. 6 is a schematic plane view showing the moving element of one of the linear motors of the X-Y table according to the invention, to illustrate more particularly its coils.

Figure 3:
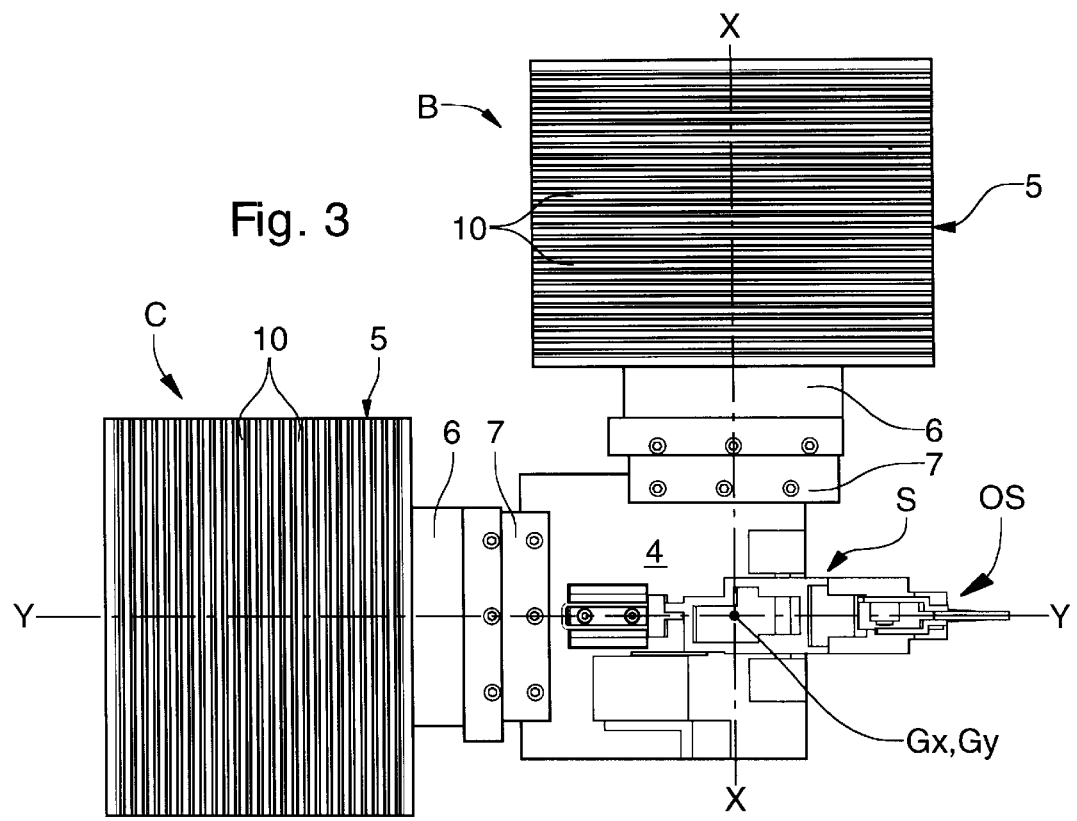
FIG. 3 is a plane view of the X-Y table shown in FIG. 2.

Reference will first be made to FIG. 1 to explain the operating principle of an X-Y table according to the invention.

The X-Y table includes three main units, namely a X-Y mobile unit A in a X-Y plane, a first linear motor B assuring movements along the active X direction and a second linear motor C assuring movements along the active Y direction perpendicular to the X direction, linear motors B and C being of identical design. << Active direction >> is used to mean the direction in which the traction or thrust force of the linear motor concerned is exerted.

Mobile unit A includes a base 1 resting on any type of working table (not shown), this base having, in the example described, a substantially rectangular shape. A first plate 2 can slide on this base along the X direction via suitable sliding means (not shown in FIG. 1). A second plate 3, which is fixed to a carriage 4 intended to support a load CH (shown symbolically in FIG. 1), can slide along the Y direction via second sliding means (also not shown) on said first plate. It will be noted that plates 2 and 3 and their associated working table together form mobile support means for carriage 4 allowing the latter to move with minimum friction in the two X-Y directions.

Linear motors B and C each include a stator 5 and a moving element 6, the latter being attached in a fixed manner to carriage 4, via a connecting part 7 and via suitable fixing means known to those skilled in the art.

In the embodiment described by way of example with reference to FIGS. 1 to 6, first and second masses moving respectively along the two active X-Y directions can be seen. These first and second moving masses each include carriage 4 and plate 3, the first moving mass driven along the X axis including plate 2 in addition to the second moving mass. These first and second moving masses have respectively centres of gravity GX and GY. According to the invention, the resulting driving forces FB and FC generated respectively by linear motors B and C define respectively first and second perpendicular fixed straight lines relative to carriage 4, whatever the position thereof. The arrangement leading to this feature of the invention will be described in more detail hereinafter. It will be noticed immediately that said second straight line parallel to the active Y direction and defined by the resulting force generated by motor C substantially intersects the vertical straight line passing through centre of gravity GY defined hereinbefore. Preferably, said first straight line substantially intersects the vertical straight line passing through centre of gravity GX of said first moving mass when carriage 4 is in a central position of the table along direction X.

FIG. 1, which gives a schematic representation of the X-Y table according to the invention, has the characteristic feature of having the two centres of gravity GX and GY aligned on a same vertical straight line Z when plates 2 and 3 are superposed onto each other. It will be noted that this situation is special given that the first and second moving masses each include moving elements 6 associated respectively with the two linear motors shown. This special situation thus results from a specific positioning of load CH on carriage 4.

In a preferred embodiment of the invention, carriage 4 is suspended by at least one air or magnetic bearing. In such case, the first and second moving masses form a single same moving part along the two active X-Y directions.

In this preferred embodiment, centres of gravity GX and GY are the same. The first and second straight lines defined respectively by the two motors B and C preferably each substantially intersect the vertical straight line passing through the single centre of gravity of the single same moving part. This particularly advantageous embodiment allows any instability and moment of force in the X-Y displacement plane to be eliminated. Indeed, given that said first and second directions are fixed relative to the moving part, in particular to carriage 4, the application of resulting forces on the moving part remains spatially fixed relative to said moving part, whatever its position in the X-Y table displacement plane.

The arrangement of the X-Y table according to the invention, in particular the arrangement of the linear motors, thus allows application of constant thrust forces on the moving part of the table. By properly arranging the moving elements of the linear motors relative to carriage 4 and to the load installed on said carriage, the resulting force exerted by each linear motor on the moving part of the table is applied in the direction of the centre of gravity of said moving part. More precisely, the straight lines defined by the resulting forces of the two linear motors substantially intersect a vertical straight line passing through the centre of gravity of the moving part (when the masses moved along the two X-Y axes are identical)

In a preferred alternative, the moving elements of the motors are arranged in a vertical position relative to the moving part so that said straight lines defined by the resulting forces of said motors intersect each other substantially at the centre of gravity of said moving part. In this latter case, the X-Y table is particularly stable and allows the moving part to be moved in a highly exact and dynamic manner.

Each of motors B and C has a degree of freedom along its own active X or Y direction and also an additional degree of freedom DLB and DLC respectively, along the active direction of the other motor. This additional degree of freedom is however limited to a certain distance indicated respectively by DB and DC in FIG. 1 and determined by the design of motors B and C. In the example shown, distances DB and DC are equal, but this is not a compulsory condition.

FIGS. 2 and 3 show an X-Y table according to the invention in accordance with an embodiment corresponding to that shown schematically in FIG. 1. FIG. 2 illustrates a possible form of the sliding means inserted between base 1 and first plate 2, on the one hand, and said first plate 2 and second plate 3, on the other hand. These sliding means are formed by respective linear bearings 8a–8b and 9a–9b.

Moreover, each motor B and C has cooling wings 10.

By way of example, carriage 4 carries a load formed by a bonding unit O, known in itself and having, in particular, a bonding tool OS able to perform bonding, in particular, on integrated circuit pads. As this bonding unit S does not form part of the invention, it will not be described in detail.

Of course, also in a known manner, the X-Y table may be fitted with position sensors (not shown) for permanently detecting the X-Y positions of carriage 4 and elaborating the position signals able to be used by electronic means controlling the movements of carriage 4 as a function of desired signals.

Figure 4:
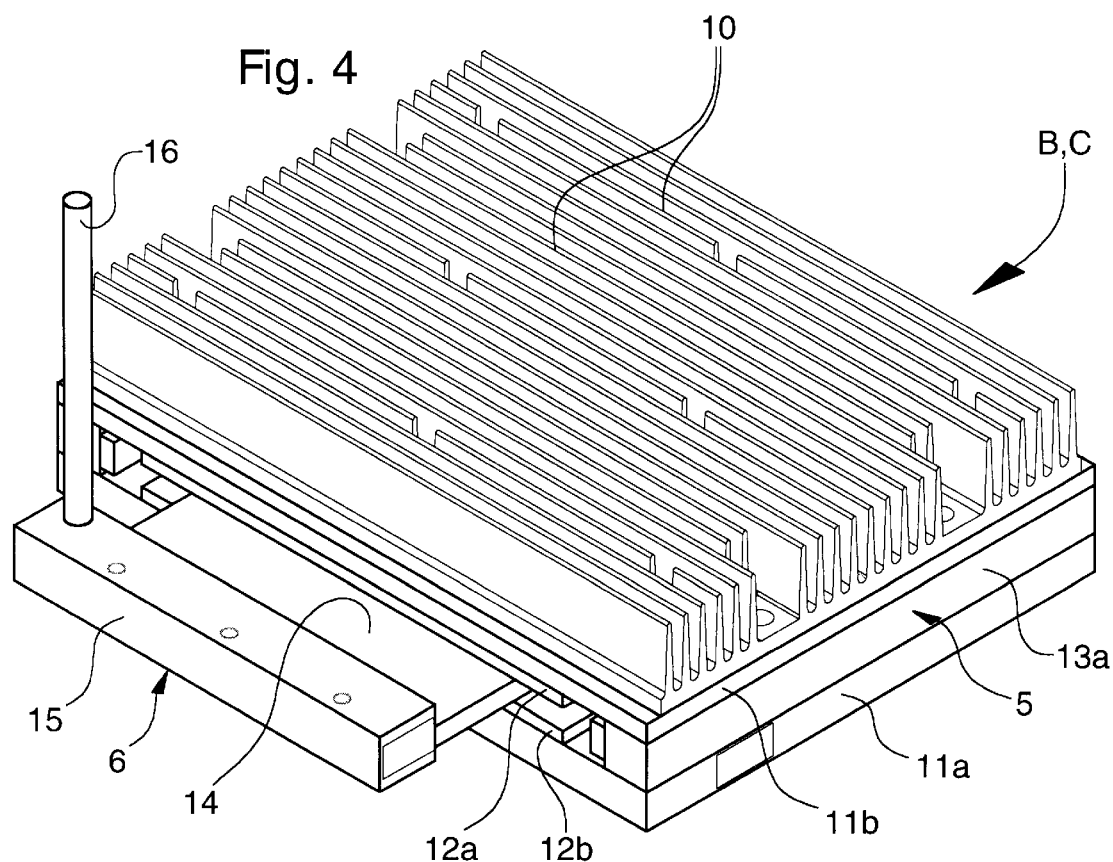
FIG. 4 is an enlarged perspective view, of one of the linear motors used in the X-Y table according to the invention.

FIGS. 4 to 6 show a structure according to the invention of each of linear motors B and C.

Stator element 5 includes two plates 11a and 11b of substantially rectangular shape and made of a suitable ferromagnetic material. Each of the two plates is provided with a series of juxtaposed magnets 12a and 12b of alternating north and south polarity, the poles N of magnets 12a of one of the plates being opposite the poles S of magnets 12b of the other plate, and vice versa. Plates 11a and 11b are held at a determined distance from each other by strut parts 13a and 13b which, at the same time, determine two airgaps of the motor. The axes of magnetisation of all the magnets 12a and 12b of each motor are parallel to each other and perpendicular to the plane defined by the active X-Y directions.

According to the invention, the length DB or DC of magnets 12a and 12b is greater than the length L of coils 20 and 21, these lengths being oriented perpendicular to the active direction of the motor concerned in the X-Y displacement plane of the moving element of said motor. Moreover, the difference between length DB spacing or DC and length L is substantially equal to or greater than the travel of the moving element of a concerned motor along the active direction of the other of the two motors B and C.

Moving element 6 of each linear motor B or C includes a plate 14 (FIGS. 2, 4 and 6) of substantially rectangular shape and of a smaller width than the distance between struts 13a and 13b in order to allow the second degree of freedom of the motor concerned.

A clamp 15 is fixed in a rigid manner onto the edge of plate 14. This clamp 15 acts as a connecting part for connecting moving element 6 to connection part 7 to which it is fixed in a durable manner by bolting, for example. Clamp 15 is also arranged for electrically connecting moving part 6 to an external control and supply circuit (not shown), via a sheath 16. A clampless design is also possible.

Two groups of coils 17a and 17b are arranged in plate 14 for example being embedded therein by moulding in a non-magnetic mass. Thus, moving element 6 is essentially non-magnetic. Plate 14 is made of a highly mechanically resistant and heat conductive material, for example a plastic material reinforced with carbon fibres in which groups of coils 17a and 17b are embedded by moulding. By way of non-illustrated example in the drawings, forced air cooling or water cooling, integrated in plate 14 may also be used.

Plate 14's bending resistance perpendicular to its direction of movement may be increased, by coating it with a layer 18 of smooth, uniform and perfectly flat superficial texture, made of rigid and non-magnetic material, such as epoxy or ceramics, permanent magnets 12a and 12b of stator 5 (layers 19, see FIG. 5) being also able to be coated with such material. The magnets may also be coated with a conductive metal plate (copper, iron or aluminium) to reduce the electric time constant of the coils. In this manner, it is possible to define a very slight mechanical play in the motor airgaps, in which the layer of air could operate as absorber or damper of any vibrations. This arrangement also has the advantage of improving the heat transfer between the coils and the magnets, which allows the efficient power of the motor to be increased for a given dimensioning of its components.

In the example described, groups of coils 17a and 17b are arranged so that motor B or C is of the two-phase synchronous type. Of course, this arrangement is only selected by way of example, any arrangement of the coils, for example in groups or in a continuous, mono or three-phase arrangement also being possible. Each group includes three coils 20 and 21, respectively, the two groups being staggered at a distance which is, in this example, half of the spatial period defined by the coils of a same group. Each coil 20 and 21 is wound flat in plate 14 along a winding axis parallel to the axes of magnetisation of the permanent magnets of stator 5 which have an identical spatial period to that mentioned hereinbefore. The coils are wound so that when a current passes through them, the coils of a same group generate alternately poles N and S.

Figure 7:
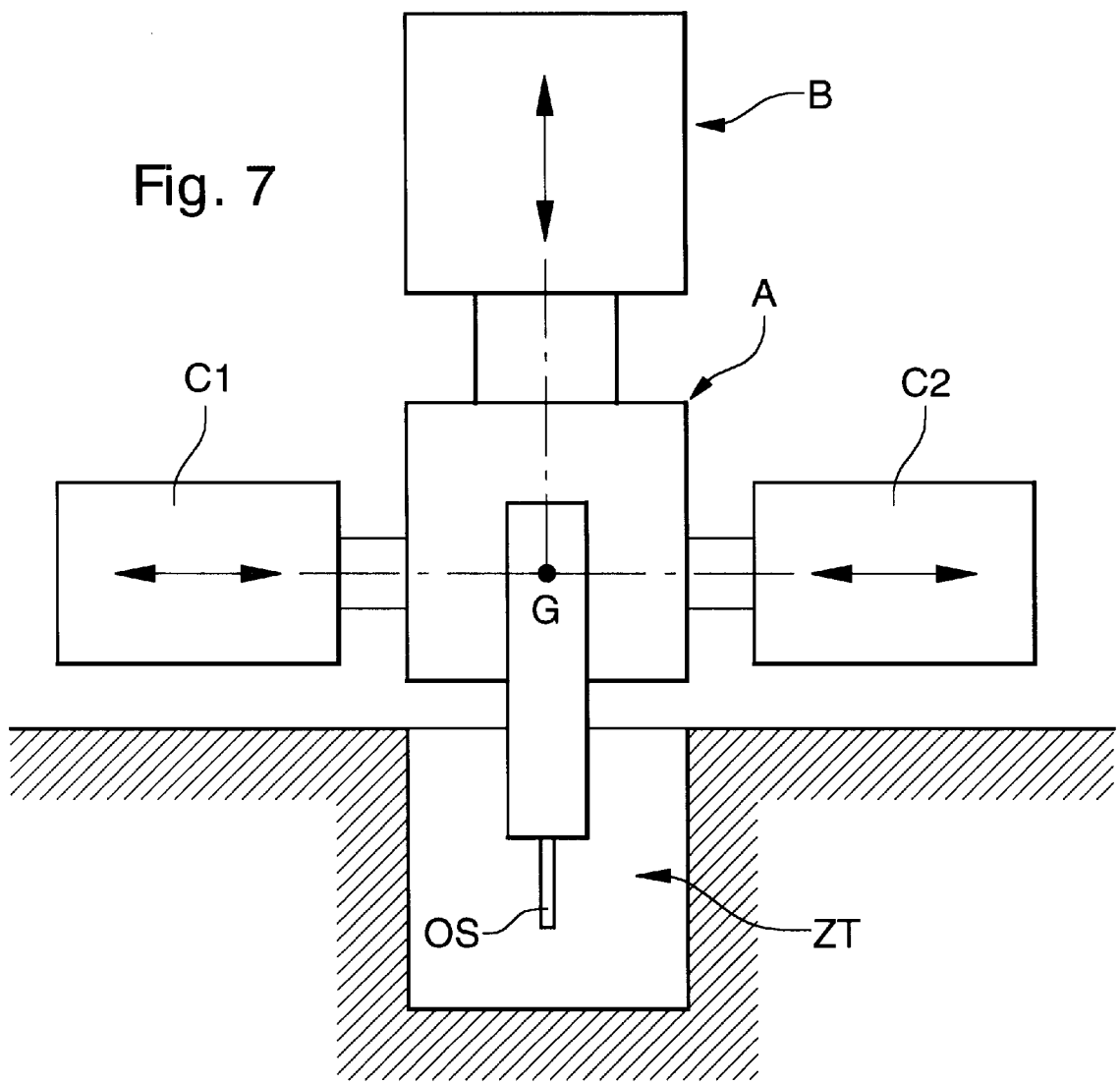
FIG. 7 shows, via a schematic plane view, an alternative of the X-Y table according to the invention.

FIG. 7 illustrates an alternative embodiment of the X-Y table according to the invention wherein linear motor C is divided into two driving units C1 and C2 having the Y direction as active direction. The use of two driving units for the active Y direction allows their dimensions to be reduced and thus the maximum clearance to the left and right of the working zone ZT swept by tool OS to be obtained. Moreover, the distribution of the force exerted by motor C on either side of the moving part of the X-Y table allows even better stability to be obtained for said moving part in motion.

What is claimed is:

1. AN X-Y table intended to move a load, such as a tool, along two mutually perpendicular active directions, said table including:

a base

A carriage adapted to receive said load and mounted so as to move on the base along said directions; and at least two electric linear motors arranged for driving said carriage respectively along said two active directions, each of the two motors including a stator provided with permanent magnets and a moving part provided with at least one excitation coil and mechanically coupled to said carriage, said permanent magnets and said excitation coil being arranged so that, when said excitation coil is supplied, their magnetic coupling generates a driving force along the active direction of the given motor, said moving part being capable of being moved along each of the two active directions the dimension of said at least one excitation coil of either of the two motors, along the active direction of the other of said two motors, being smaller than the corresponding dimension of said permanent magnets of said motor, the difference between these two dimensions being substantially equal to or greater than the travel of the moving element of the motor concerned along the active direction of the other of said two motors.

2. An X-Y table according to claim 1, wherein said moving element of each of the two motors is essentially formed of non-magnetic material.

3. An X-Y table according to claim 1, wherein the moving element of at least one of the two motors is provided with several flat juxtaposed coils whose winding axes are perpendicular to the plane defined by said two active directions.

4. An X-Y table according to claim 3, wherein said at least one motor provided with several coils is a polyphase motor.

5. An X-Y table according to claim 4, wherein each phase of said polyphase motor is associated with at least two coils among said several coils.

6. An X-Y table according to claim 5, wherein each phase of said polyphase motor is associated with at least one group of juxtaposed coils of alternating polarities along the active direction of said polyphase motor, the polarities of said permanent magnets of the stator of said polyphase motor being also alternated along its active direction, the spatial period defined by the coils in said group being substantially identical to the spatial period of said permanent magnets.

7. An X-Y table according to claim 1, wherein a first of the two motors drives a first moving mass along its active direction and the second of said two motors drives a second moving mass along its active direction, the resulting force exerted by said first motor defining a first straight line which substantially intersects a vertical straight line passing through the centre of gravity of said first moving mass, said first straight line having a fixed position relative to said first moving mass.

8. An X-Y table according to claim 7, wherein said carriage is mounted so as to move on said base via sliding means for each of the two active directions of said table.

9. An X-Y table according to claim 7, wherein said first and second masses form a single same moving part moved along the two active directions of the table, the resulting force exerted by said second motor defining a second straight line which substantially intersects said vertical straight line, said second straight line having a fixed position relative to said single same moving part.

10. An X-Y table according to claim 9, wherein said first and second straight lines substantially intersect the centre of gravity of said single same moving part.

11. An X-Y table according to claim 9, wherein said carriage is mounted so as to move on said base by means of at least one air or magnetic bearing.

12. An X-Y table according to claim 1, wherein that for each of the two linear motors, two series of permanent magnets are provided arranged on either side of the moving element so that each pair of permanent magnets situated facing the other defines two magnetic axes of the same direction.

13. An X-Y table according to claim 1, wherein one of the two linear motors is formed by two distinct driving units situated on either side of the moving carriage.

* * * * *